United States Patent [19]

Hulme-Lowe et al.

[11] Patent Number: 4,861,697

[45] Date of Patent: Aug. 29, 1989

[54] RECORDING MEDIUM FOR OPTICAL DATA STORAGE

[75] Inventors: Alan G. Hulme-Lowe, Bishops Stortford; Vivien L. Bell, Brentwood, both of Great Britain; Ian J. Ferguson, St. Paul, Minn.

[73] Assignee: Minnesota Mining and Manufacturing Company, St. Paul, Minn.

[21] Appl. No.: 202,499

[22] Filed: Jun. 3, 1988

[30] Foreign Application Priority Data

Jun. 10, 1987 [GB] United Kingdom ................. 8713563

[51] Int. Cl.$^4$ .............................................. G03C 1/76
[52] U.S. Cl. .................................... 430/270; 430/495; 430/945
[58] Field of Search ................................ 430/270, 495

[56] References Cited

U.S. PATENT DOCUMENTS

| | | | |
|---|---|---|---|
| 3,989,860 | 11/1976 | Herbert et al. | 430/56 |
| 4,387,209 | 6/1983 | Rieder et al. | 528/176 |
| 4,388,454 | 6/1983 | Rieder et al. | 528/176 |
| 4,529,688 | 7/1985 | Law et al. | 430/945 |
| 4,547,444 | 10/1985 | Bell et al. | 430/945 |

OTHER PUBLICATIONS

"Ciba-Geigy, Resins Dept. Product Data Sheet on Polyimide XU 218".
"Union Carbide, Engineering Polymers Product Data Sheet on Udal ® Polysulfone".
"Chemische Fabrik WEYL A6, Product Information Sheet on Acenaphthylene".

Primary Examiner—Paul R. Michl
Assistant Examiner—Thorl Chea
Attorney, Agent, or Firm—Donald M. Sell; Walter N. Kirn; Mark A. Litman

[57] ABSTRACT

An optical data storage element in which information can be recorded and read directly afterwards by means of laser light comprising, as a recording medium a dye dissolved or dispersed in a binder in which at least 25% by weight of the binder comprises a polymer in which at least 50% of the units have the general formula:

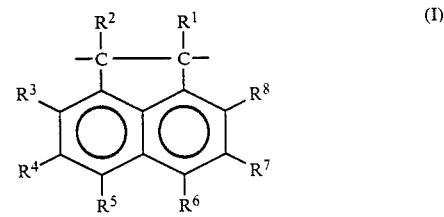

in which:

$R^1$ to $R^8$ are independently selected from hydrogen, an alkyl group of up to 12 carbon atoms, an aromatic group of up to 12 carbon atoms, halogen, ether, carboxylic acid, ketone, nitro, amino and hydroxy groups of any two adjacent groups of $R^1$ to $R^8$ may comprise the necessary atoms to complete a carbocyclic or heterocyclic ring, and there are at least 10 units of formula (I) within the polymer chain.

The dye-polymer system possesss high sensitivity acceptable CNR and particularly good stability to repeated read.

24 Claims, 2 Drawing Sheets

RECORDING MEDIUM FOR OPTICAL DATA STORAGE

FIELD OF THE INVENTION

This invention relates to an optical recording element in which information can be recorded and read by means of laser light. In particular, the invention relates to an optical recording element comprising a substrate having on at least one side a recording medium comprising dye dispersed or dissolved in a binder.

BACKGROUND TO THE INVENTION

Continuing advances in information handling technology have lead to the requirement for data storage and retrieval systems capable of handling extremely large volumes of information. Optical recording, in particular optical disc recording, allows recording and accessing of information at very high data rates with a much greater recording density and archivability than is possible with magnetic recording. A highly focussed laser beam is utilized to record and recover information on the optical recording media. The selection and alignment of diode lasers into an optical recording system is discussed by Bartolini et al. in I.E.E.E. Journal of Quantum Electronics, 1981, p. 69, and both read and write apparatus are disclosed in British Patent Application No. 1 016 747A.

Many types of recording media have been disclosed for laser writing and these can be divided into two basic sorts: those which require processing after writing, and those which can be read immediately after writing. It is the latter type, possessing "direct read after write" capability and commonly known as "DRAW" media, which are of particular interest.

In order to be useful as a light absorbing layer of the recording element, materials must be able to be applied to a substrate in the form of a thin, smooth layer of high optical quality and predetermined thickness and they must absorb at the frequency of the optical source. Various materials have been proposed for the recording media of DRAW systems, including, for example, thin metal films, metal-impregnated polymers and organic dyes. In these cases the laser beam provides a pulse of heat energy to the recording medium which causes a change in surface morphology; i.e., formation of a bump or crater, by ablation, vaporization or melting.

One type of DRAW media comprises thin metal films and, of these, tellurium containing mixtures as disclosed in Lou et al., J. Vac. Sci. Technol., 1981, 18, 78 have been widely used. However, the preparation of recording elements incorporating tellurium is by a relatively expensive vacuum sputtering technique in which the metal does not adhere well to the substrate. It also presents environmental complications because of its toxicity.

Examples of the use of metal-impregnated polymers in recording elements include the silver-impregnated gelatin systems disclosed in U.S. Pat. No. 4 278 758. Greater sensitivity is claimed for these systems than for the tellurium films, but high concentrations of expensive silver are used in the recording medium.

An alternative type of DRAW media uses organic compounds in place of expensive metals. As well as providing advantages of cost, the thermal properties of organic compounds are generally superior since they possess low thermal conductivity and low melting-/decomposition temperature. With the use of such systems it is important that the absorption of dye therein corresponds as closely a possible with the emission of the recording laser. Of the various lasers available, semi-conductor laser diodes have the advantages, over conventional gas lasers, of low cost and size and the possibility of easy signal modulation. The problem is, therefore, one of finding organic materials which have all the requisite physical properties and absorb strongly in the region compatible with laser diodes; i.e., the near infrared region of the spectrum, wavelengths between 700 and 1400 nm. Examples of dye-containing recording media for optical data storage are disclosed in Jipson and Jones, J. Vac. Sci. Technol., 1981, 18, 105, European Patent Application No. 79 200 789, Crowly et al., IBM Technical Disclosure Bull, 24, No. 11B, 1982, Law et al., Appl. Phys. Lett., 1981, 39, 718, U.S. Pat. Nos. 4,270,130, 4,364,986 and 4,446,223, PCT Patent Publication Nos. WO84/02794 and WO84/02795 and Japanese Patent Publication Nos. 57 203 237, 57 210 893, 57 210 894, 58 053 489, 58 056 894, 58 056 895, 58 077 043, 043, 58 112 792, 58 219 090, 58 222 451, 58 224 447, 59 005 095, and 59 055 795.

The use of organic dyes in optical data storage systems has, however, some problems since the dyes tend to crystallize once applied to the substrate in thin layers, with an accompanying reduction in medium performance. This problem has been resolved, in the main part, by the coating of dye in a polymeric binder with a resultant elimination of significant detrimental crystallization.

Many of the reports on dye-in-binder systems have been concerned with the ablation properties of dye-polymer films.

In practice, the major problem encountered in the use of dye-polymer media is not that ablation does not take place, but rather that on being repeatedly read, particularly when using a "read laser" of the same wavelength as the "write laser", the carrier to noise ratio is unacceptably degraded. To reduce the cost of the write-/read device it is conventional that only a single laser is used. Therefore although the read laser power used is only a fraction of the write power, it is inevitable that absorption of the incident light during reading will occur.

There is no specific teaching in the art as to the type of binder which is most suitable for use in dye-polymer optical recording media. In general dye-polymer ablative systems are said to be superior to absorbing metal systems because of their low conductivity, low decomposition temperature and low melting point. Polymeric binders with low melting points are exemplified, together with binders of low or oligomeric weights as imparting high or increased sensitivity to the media. However, examples of thermoplastics having higher glass transition temperatures, e.g. polyesters, polycarbonates, poly(N-vinyl carbazole) appear in general lists of possible binders. The most commonly used binders are cellulose derivative, especially nitrocellulose, thereby obeying the guidelines of low decomposition/-melting point and low binder molecular weight.

We have now found that dye-polymer ablative systems having a binder based on poly(acenaphthylene) possess particularly advantageous properties particularly with regard to stability and repeated reading. In particular, binders in which at least 25% by weight of the binder comprises a polymer in which at least 50% of the repeating units have a common nucleus of the general formula:

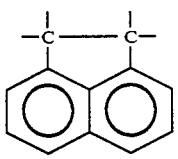

are suitable for use in the invention.

BRIEF SUMMARY OF THE INVENTION

Therefore, according to the present invention there is provided an optical data storage element in which information can be recorded and read directly afterwards by means of laser light comprising, as a recording medium, a dye dissolved or dispersed in a binder in which at least 25% by weight, preferably 50% by weight of the binder comprises a polymer in which at least 50% of the repeating units have the general formula

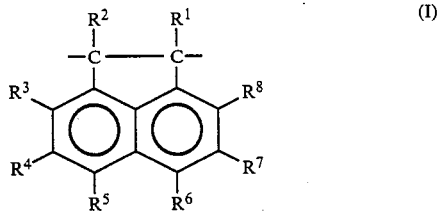
(I)

in which:

$R^1$ to $R^8$ are independently selected from hydrogen, alkyl group of up to 12 carbon atoms, an aromatic group of up to 12 carbon atoms, halogen, ether, carboxylic acid, ketone, nitro, amino and hydroxy groups or any two adjacent groups of $R^1$ to $R^8$ may comprise the necessary atoms to complete a carbocyclic or heterocyclic ring, and there are at least 10 units of formula (I) within the polymer chain.

DESCRIPTION OF PREFERRED EMBODIMENTS

Preferably $R^3$, $R^4$, $R^7$ and $R^8$ are hydrogen. A particularly preferred polymer is poly(acenaphthylene) in which each of $R^1$ to $R^8$ is hydrogen.

Preferably the binder contains at least 70% by weight of poly(acenaphthylene) and more preferably the binder consists of a homopolymer of acenaphthylene. Copolymers of acenaphthylene are also useful, providing at least 50% of the units are acenaphthylene.

The invention provides a dye-polymer system of high sensitivity, acceptable CNR and particularly greatly extended stability to repeated read compared to other known binders. The reason for the exceptional behaviour of poly(acenaphthylene) is not known nor is it predictable from the prior art. Thus, whilst poly(acenaphthylene) has a high glass transition temperature, compared to that of some known binders, other binders having a high Tg in excess of that of poly(acenaphthylene) do not possess such good properties of read stability.

The optical recording element of the invention may be in the form of a support having a recording layer coated thereon comprising one or more dyes together with the binder, or the element may be in the form of a self-supporting structure; e.g. a cast film, comprising one or more dyes and the binder.

The binders of the invention may be used, in principle, with any dye that absorbs strongly at the output wavelength of the laser used for reading and writing (normally in the range 800 to 850 nm), and which does not bleach or change its absorption characteristics under irradiation. In practice, the choice of dye will be governed by such factors as solubility in the coating solvent, reluctance to crystallise in the coating, thermal stability, resistance to fading, etc. Dyes from various classes may be suitable, e.g. carbocyanines, merocyanines and phthalocyanines. A particularly suitable class are the tetra-aryl polymethines described in U.S. Pat. No. 4,547,444.

The dye must be present in the region of the surface of the recording layer in a sufficient amount to absorb an effective amount of the exposing radiation to produce a detectable mark on the surface thereof. It is not possible to generally quantify the minimum amount of dye required for optical recording either in terms of coating weights or optical density of the recording layer or element since the minimum amount will vary according to the dye, the thickness of the recording layer and the particular binder present. For example, a thick layer of recording medium having a high optical density and coating weight of dye may have inferior performance to a thin layer having a lower optical density and coating weight.

The thickness of the coated recording layer is an important factor in controlling the efficiency of the laser in forming pits since good writing sensitivity requires that writing energy be effectively coupled into the recording layer. A. E. Bell and F. W. Spong, I.E.E.E. Journal of Quantum Electronics, July 1978, 487, discloses in general, that optimum write situations are obtained when the recording layer has a thickness about one quarter the wavelength of the recording light. In recording elements of the present invention sensitivity is improved as the thickness of the recording layer is reduced below 1 micron and in preferred embodiments the thickness is in the range from 30 to 400 nm, although a general range of 10 to 1000 nm may be used.

The recording layer is generally coated onto a substrate which acts as a support. The support may be substantially any solid material, either flexible or rigid including polymeric materials; e.g. polyacrylates polyamides, polycarbonates, polyesters, polyolefins, polysiloxanes, polyurethanes and polyvinyl resins; ceramic or glass materials; fibrous materials and metals. The support must have a softening point high enough to avoid deformation during writing of information. Also the surface of the substrate which is to be coated should be smooth and free of random surface irregularities, although it may be flat, pre-grooved or may include predetermined surface irregularities capable of being read by laser light in the final element to provide an indexing function, tracking function, or the like.

In one embodiment of the invention the substrate is transparent so that recording and reading can take place through the substrate.

Preferably a reflecting layer is provided either between the substrate, and the recording layer, or, if writing and reading is to take place through the substrate on top of the recording layer. A preferred construction comprises a semi-reflecting layer interposed between the recording layer and the transparent substrate, as taught, for example, in Japanese Patent Application No.

60-157739. Suitable materials include aluminium, copper, chromium, gold and rhodium. The thickness of the light reflecting layer should be sufficient to effect a significant amount of the recording light. Levelling and/or priming layers may also be applied to the substrate before application of the reflective coating and/or dye containing layer. If the reflecting material itself can be formed so it is a self-sustaining layer and optically smooth, it may constitute the substrate.

A recording element in which there is both a reflecting layer and the recording layer is termed a bilayer system. This can be expanded to a trilayer system by the insertion of a spacer between the reflecting layer and the recording medium. The spacer may confer smoothness, help control the thermal performance of the medium and protect the reflecting layer. A dielectric spacer may comprise vacuum deposited $SiO_2$, or an organic polymer which does not contain any of the light-absorbing dye. The dielectric spacer is preferably transparent to the laser beam used in reading and writing on the recording layer. Examples of the construction of such recording elements are disclosed in Bartolini et al., J. Quantum Electronics, 1981, page 69.

In the recording elements of the present invention the recording information is carried in the form of marks; e.g. about 1 micron in size, in the recording layer. Because of the high density of the information, dust or other foreign materials on the top surface of the recording layer would cause significant errors. Therefore, in one embodiment of recording elements of the present invention a protective layer at least 0.6 microns thick is provided on top of the recording layer to separate dust and other particles from the recording layer. The laser beam is sharply convergent at the top surface of the recording layer and accordingly any dust particle on the protective layer would be out of focus with respect to the laser beam and thus not affect the reading and writing process. The protective layer can be made of any material which is transparent to laser beams used in reading and writing on the recording layer and it can either be directly in contact with the recording layer or separated from it by an air, nitrogen or vacuum gap. Suitable materials which can be used for the protective coating include glass, poly(methyl methacrylate), polycarbonates and polyesters.

The recording elements of the invention may be double-sided, comprising a planar substrate optionally in the form of a disc, having on each major surface a reflecting layer, above which is coated the recording medium and optionally a protective layer.

Other suitable constructions of optical recording elements are disclosed in The Design and Optimization of the Optical Data Disk, Alan E. Bell, Proceedings of the SID, Vol 24/1, 1983, pages 17 to 23.

The particular dye/binder ratio selected is a balance between one end of the range where a high dye/binder ratio leads to the possibility of undesirable crystallization, whilst at the other extreme too little dye may result insufficient heat softening from the dye to the binder to cause ablation and hence prevent recording. In a control experiment without dye present, irradiation of the polymeric binder with the laser diode caused no marking of the surface. Another limitation on increasing the dye/binder ratio is the solubility of the dye in the coating solution. In practice, dye/binder weight ratios may range from 1:30 to 5:1 and preferably from 1:20 to 2.5:1.

In order to achieve the desired dye/binder ratios in a coating solution and to obtain viscosities suitable for spreading, the solubility of the dye is preferably at least 10 mg/ml in the solvent chosen and more preferably at least 30 mg/ml.

The solvent used for preparing the coating composition may be selected from a wide range of known solvents such as dichlorinated solvents; e.g., diclioromethane and 1,2-dichloroethane, or ketonic solvents; e.g., cyclohexanone, or aromatic solvents; e.g., xylene. The solvents can be used alone or in combination, the choice being governed to some extent by the particular dye/binder system and by the method of coating used.

Suitable methods of coating the composition include handcoating, dipcoating, spincoating and webcoating. A very suitable process is the centrifugal spincoating process. According to this process, the substrate to be covered is laid on a turntable and a quantity of solution is then provided on the substrate. By rotating the substrate, the liquid will spread circularly over the surface of the substrate. It has been found in experiments that very thin layers can be obtained by means of the centrifuging process, the thickness of which depends inter alia on the rotation speed of the substrate and the viscosity of the solution to be spread. It has been found that layers having a thickness smaller than 1 microns are obtained if the viscosity of the solution lies in the order of magnitude of a few centipoise, for example, up to 10 cP, and a speed of rotation is used of approximately 500 to 2500 rpm. The percentage of solid substance in the solution preferably should be low and generally be at most 5 to 10% by weight. Film thicknesses less than 0.3 microns can readily be achieved in this manner.

In an illustrative recording system embodying the principles of the present invention, a record blank comprising a substrate coated with a reflective layer, a recording medium of the invention and an optical protective layer, in the form of a disc is subjected to rotation at a constant rotational speed while a beam of light from a light source (e.g., a laser providing light at a wavelength at which the recording medium is absorbing) is focussed on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes.

Information tracks comprising a succession of spaced pits are formed in the coated surface of the disc, the pits appearing in those surface regions exposed to high level beam due to vaporization or melting of the absorptive layer material in response to the high level beam exposure. Variations in the length and separation of the pits are representative of the recorded information. Where a continuous sequence of pits is to be recorded, a spiral information track may be formed by providing relative motion, in a radial direction and at a constant rate during the recording between the recording beam and the rotating disc. Alternatively, in the absence of such relative motion during the recording, a circular information track may be formed.

The result of the above-described recording process is the formation of an information record in a form which facilitates recovery of the recorded information by optical playback process. The information trace of such an information record comprises undisturbed surface regions that exhibit very low reflectance to an appropriate light frequency, alternating with pit regions, formed by the ablation process, that exhibit appreciably high reflectance at the same light frequency. A high ratio between the reflectance of the pit regions and the reflectance of the intervening (undisturbed surface) regions is readily provided. Media exhibiting lower reflectively after writing may also be made.

In playback operations pursuant to the principles of the present invention, a light beam is focussed upon the information track of a rotating information record of the above described type. The playback beam has a constant intensity at a level insufficient to effect ablation of the disc coatings, and is of a frequency substantially corresponding to that at which the undisturbed surface regions exhibit an antireflection condition. A photodetector, positioned to receive light reflected from the successive regions of the information track as they pass through the path of the focussed light, develops a signal representative of the recorded information. A high readout contrast ratio (due to the large differences in reflectance of the pit regions and the intervening track regions, at the light frequency of the playback beam) is readily obtained, permitting recording of the recorded video signals with an excellent signal-to-noise ratio.

As well as finding utility as elements for writing and storing optical data and thereafter retrieving said data, the elements of the invention may be used as a master element for the production of other elements which are capable of being read by laser light. For example, an element of the invention may be used to record information by means of laser light ablating background areas and the resulting elements may be used as a mould to produce a positive replica having surface irregularities complementary to those recorded in the recording media of the master element. The replica may be produced by coating a curable resin system; e.g. an epoxy resin system over the surface of the element bearing recorded information and exposing the resin to ultraviolet light thereby curing the resin. The replica may then be stripped from the master element and its surface will possess a series of deformations corresponding to the deformations in the surface of the recording media. These surface irregularities may be read by low laser power light after further processing; e.g. deposition of a reflecting layer.

The invention will now be illustrated by the following Examples in which the test procedure used to evaluate the recording elements was as follows:

The recording layers were tested using dynamic media characterization apparatus similar to that described in Proceedings of SPIE (1983), Volume 382, 157–162.

Pits were normally written with 10 mW incident laser power, modulated at 2.5 MHz with a 50% duty cycle square wave. The standard read power was 1.2 mW, but some repeated read tests have been performed at other powers in the range 1.0 to 2.0 mW. Carrier-to-noise ratio (CNR) was measured with a 30 kHz resolution bandwidth using a spectrum analyzer. Disk rotation speeds and test radii were chose to give linear velocities in the range 8 to 12 meters per second.

EXAMPLE 1

The recording elements used comprised a 5.25 inch (13.35 cm) diameter disc consisting of a polymethylmethacrylate substrate having a grooved underlayer thereon to define the tracks of the element and an aluminum vapour-coated topcoat as a reflector. The recording medium was cast over the reflector surface by spin coating at 1500 rpm. The coating compositions comprise 4:1 (vol:vol) dichloroethane:cyclohexanone as solvent, the selected binder, and dye (A) of the formula:

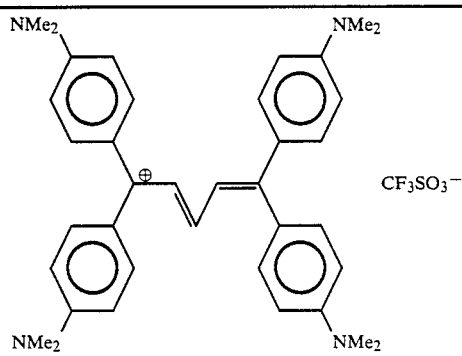

in which:
Me is $CH_3$.

The following binders were used:

| | |
|---|---|
| poly(acenaphthylene) (commercially available from Aldrich Chemicals) | PAN |
| polycarbonate (Makrolon 3200) | PC |
| Polymethylmethacrylate (35,000 g/mole) | PMMA |
| polyarylsulphone (Udel commercially available from Union Carbide) | PS |
| polyimide (XU218 commercially available from Ciba-Geigy) | PI |
| fluorenone-polyester (U.S. Pat. No. 4387209) | FPE |
| triphenylethane-polyester (U.S. Pat. No. 4388454) | CPE |

The coating compositions used to form the recording media which were optimised are reported in the following Table 1.

TABLE 1

| Binder | % solids of composition | solids content % dye | % binder |
|---|---|---|---|
| PAN | 0.85 | 54.1 | 45.9 |
| PC | 0.956 | 54.1 | 45.9 |
| PS | 1.076 | 54.1 | 45.9 |
| PMMA | 0.90 | 50.0 | 50.0 |
| PI | 0.926 | 54.1 | 45.9 |
| CPE | 0.85 | 40.0 | 60.0 |
| FPE | 0.72 | 40.0 | 60.0 |

The recording elements were evaluated by the test method described above using a GaAs laser at 820 nm at 10 mW over a 2 micron spot. Exposure time was about 150 nanoseconds. Reading was conducted using the same laser at 1 mW. The results are recorded in FIGS. 1 to 3 of the accompanying drawings in which:

FIG. 1 represents a plot of read cycles to reduce the carrier-to-noise ratio (CNR) to 45 dB against Tg of the binder. FIG. 1 indicates a trend that repeated read stability is increased by the use of good film forming, more thermally stable polymers and binder materials. However, PAN as a binder leads to markedly better stability to repeated reading than could be expected from a consideration of the performance of the other binder systems.

Figure 1:
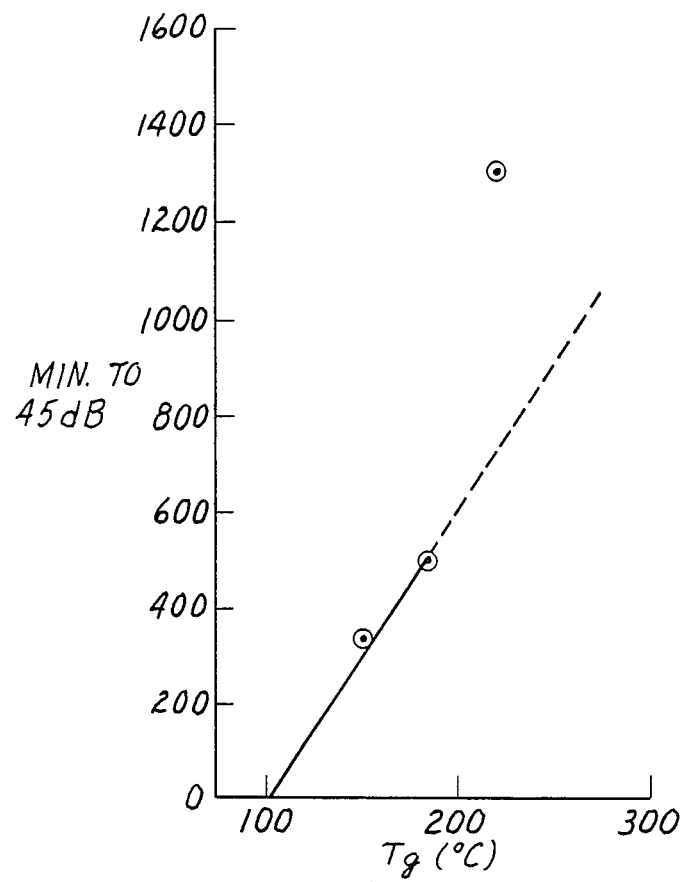
Figure 2:
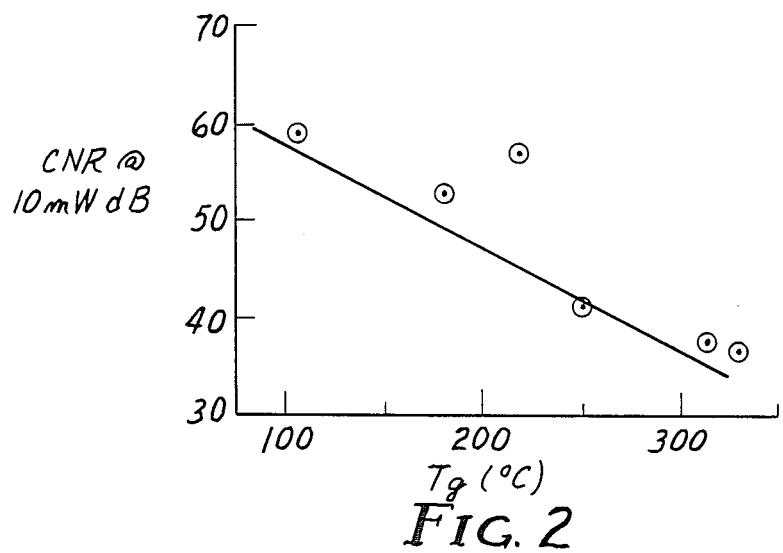
FIG. 2, represents a plot of CNR against Tg of the binders and demonstrates a general trend that binders with lower glass transition temperatures lead to greater sensitivity and hence a higher CNR. However, PAN seems to be markedly better than the general trend would predict.
Figure 3:
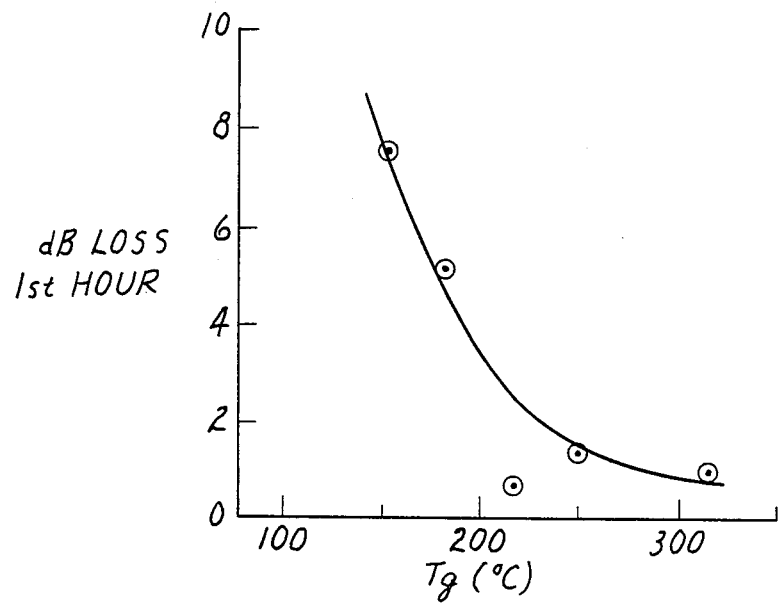
FIG. 3 depicts an alternative method of assessing repeated read stability. In this method the thermal stability, (as indicated by glass transition temperature), is plotted against loss of CNR in unit time, thereby allowing assessment of binders independently of arbitrarily set, acceptable starting and finish CNR limits.

Use of PAN is again observed to result in surprisingly improved performance compared with the performance predicted by interpolation of results obtained from alternative materials.

EXAMPLE 2

This example compares the effect on repeated read stability of PAN and PMMA binder employing Dye (B) in the recording medium. Dye (B)

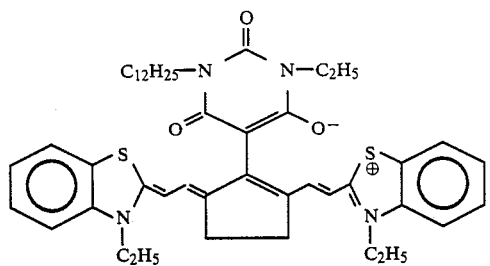

Recording elements were prepared as in Example 1 using coating compositions comprising 0.97% solids in a solvent consisting of 4:1 (vol:vol) dichloroethane:cyclohexanone. The dye and binder content are reported in the following Table 2 together with the loss in CNR after 100,000 read cycles. The recording elements were evaluated as described in Example 1 employing a write power of 10 mW and read power of 1.2 mW.

TABLE 2

| Binder | Solids % dye (B) | % binder | % solids | CNR loss (dB) |
|---|---|---|---|---|
| PAN | 40 | 40 | 0.97 | 1.5 |
| PMMA | 40 | 60 | 0.97 | 6.7 |

The results clearly indicated the significant stability of the medium employing the PAN binder compared to that employing PMMA.

EXAMPLE 3

This Example illustrates the blending of PAN with other amorphous, thermally stable binders.

Three polymers PMMA, PS and FPE were individually blended with PAN in weight ratios 1:3, 1:1 and 3:1. Only those blends showing no evidence of phase separation were used. The polymer blends were incorporated into coating compositions comprising 4:1 (vol:vol) dichloroethane: cyclohexanone as solvent and Dye (A) used in Example 1. The coating compositions were used to prepare recording elements as described in Example 1 and the elements were evaluated as in Example 1 employing a write power of 10 mW and read power of 1.2 mW.

The coating compositions and properties of the recording elements are reported in the following Table 3.

TABLE 3

| Binder | Solids % dye | % binder | % Solids | CNR initial (dB) | CNR after 100k reads (dB) | ΔCNR (dB) |
|---|---|---|---|---|---|---|
| PAN | 25.9 | 74.1 | 0.90 | 51.9 | 49.5 | −2.4 |
| PMMA | 25.9 | 74.1 | 0.90 | 52.3 | 47.9 | −4.4 |
| PAN:PMMA 1:3 | 25.9 | 74.1 | 0.90 | 52.9 | 50.0 | −2.9 |
| FPE | 25.9 | 74.1 | 0.60 | 26.7* | 28.7 | |
| PAN:FPE 1:1 | 25.9 | 74.1 | 0.55 | 44.7 | 46.1 | +1.4 |
| PS | 25.9 | 74.1 | 0.90 | 45.6 | 48.4 | +2.8 |
| PAN:PS 1:3 | 25.9 | 74.1 | 0.90 | 48.6 | 48.8 | +0.2 |
| PAN:PS 1:1 | 25.9 | 74.1 | 0.90 | 51.4 | 50.3 | −1.1 |
| PAN:PS 3:1 | 25.9 | 74.1 | 0.90 | 51.7 | 45.2 | −6.5** |

*the CNR results are too low to be of practical utility
**PAN and PS blended in the ratio 3:1 are at the borderline of compatibility, and phase-separation probably occurred during the test, leading to poor repeated-read stability.

The results indicate that PAN blends with the above polymers, providing beneficial properties to the recording medium compared with the use of PMMA, FPE and PS as the sole binder. This is particularly marked for the PAN/FPE blend improving initial CNR and repeated read.

Figure 4:
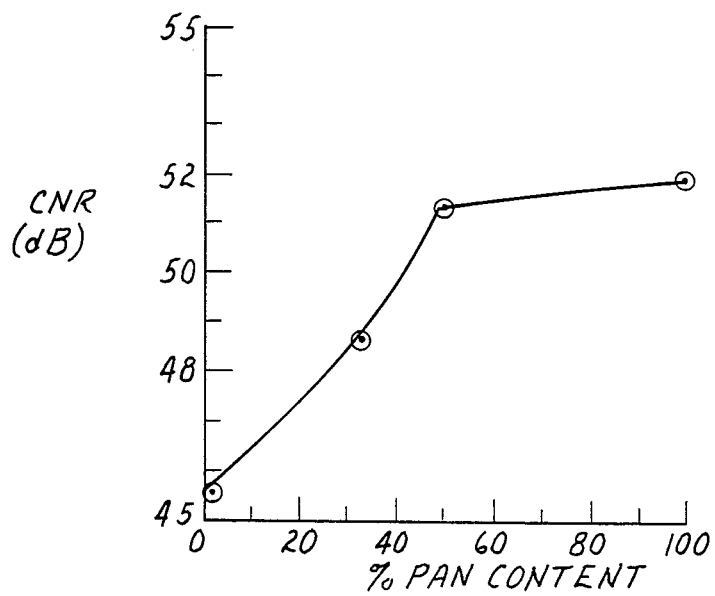

FIG. 4 of accompanying drawings represents a plot of initial CNR against PAN content in the binder system comprising PAN/PS.

EXAMPLE 4

This Example illustrates the use of a copolymer of acenaphthylene (AN) and hydroxyethyl acrylate (HEA) in molar proportions 80:20 respectively.

Coating compositions comprising a solvent system as in Example 1, binder and dye (A) were prepared having a solids content of 0.86%. The binder content was 60% and dye (A) 40%. The compositions were coated to form recording elements as described in Example 1. Evaluation of the recording elements was conducted as in Example 1 employing a write power of 10mW and a read power of 1.2 mW.

TABLE 4

| Binder | CNR initial (dB) | CNR after 5.8 × 10⁵ reads (dB) |
|---|---|---|
| AN/HEA | 51.0 | 47.2 |
| PAN | 50.7 | 45.1 |

We claim:

1. An optical data storage element in which information can be recorded and read directly afterwards by means of laser light comprising, as a recording medium a dye dissolved in a binder characterised in that at least 25% by weight of the binder comprises a polymer in which at least 50% of the repeating units have the general formula:

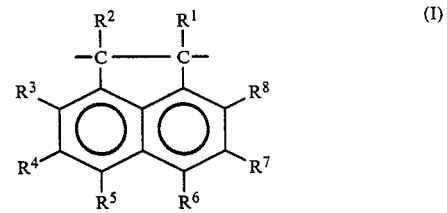

in which:

R¹ to R⁸ are independently selected from hydrogen, an alkyl group of up to 12 carbon atoms, an aromatic group of up to 12 carbon atoms, halogen, ether, carboxylic acid, ketone, nitro, amino and hydroxy groups or any two adjacent groups of R¹ to R⁸ may comprise the necessary atoms to complete a carbocyclic or heterocyclic ring, and there are at least 10 units of formula (I) within the polymer chain.

2. An element as claimed in claim 1 characterised in that at least 50% by weight of the binder comprises a polymer in which at least 50% of the units have the general formula (I).

3. An element as claimed in claim 2 characterised in that R³, R⁴, R⁷ and R⁸ are hydrogen.

4. An element as claimed in claim 3 characterised in that R¹ to R⁸ are hydrogen.

5. An element as claimed in claim 4 characterised in that the binder comprises at least 25% by weight of poly(acenaphthylene).

6. An element as claimed in claim 1 characterised in that the binder consists of a homopolymer of acenaphthylene or comprises a copolymer of acenaphthylene in which at least 50% of the units are acenaphthylene units.

7. An element as claimed in claim 1 characterised in that the weight ratio of dye:binder in recording layer is from 1:30 to 5:1 and the recording layer has a thickness of less than 1 micrometer.

8. An element as claimed in claim 1 characterised in that it comprises a support having a layer of the recording medium coated thereon.

9. A recording element as claimed in claim 8 characterised in that the surface of the substrate to which the recording layer is applied is light reflective or a reflecting layer is interposed between the recording layer and substrate.

10. A recording element as claimed in claim 8 characterised in that the support is transparent to visible and near infra-red radiation and that a semi-reflective layer is interposed between the substrate and the recording layer.

11. An optical recording element as claimed in claim 8 characterised in that a dielectric layer is interposed between the recording layer and substrate.

12. An optical recording element as claimed in claim 8 characterised in that the substrate is substantially free from random surface irregularities having on each major surface a reflecting layer above which is coated a recording layer.

13. An optical recording element as claimed in claim 1 characterised in that the top surface of the recording medium is protected by an overcoat layer of material transparent to near infrared radiation either directly in contact with it or separated from it by a clean sealed, air, nitrogen or vacuum gap.

14. An optical data storage element in which information can be recorded and read directly afterwards by means of laser light comprising, as a recording medium a dye dissolved or dispersed in a binder in which at least 25% by weight of the binder comprises a polymer in which at least 50% of the repeating units have a common nucleus of the general formula:

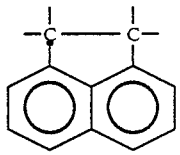

15. The element of claim 1 comprising a disc with said recording on a face thereof.

16. An element as claimed in claim 15 characterised in that at least 50% by weight of the binder comprises a polymer in which at least 50% of the units have the general formula (I).

17. An element as claimed in claim 15 characterised in that R³, R⁴, R⁷ and R⁸ are hydrogen.

18. An element as claimed in claim 16 characterised in that R¹ to R⁸ are hydrogen.

19. An element as claimed in claim 18 characterised in that the binder comprises at least 25% by weight of poly(acenaphthylene).

20. A recording element as claimed in claim 15 characterised in that the surface of the substrate to which the recording layer is applied is light reflective or a reflecting layer is interposed between the recording layer and substrate.

21. A recording element as claimed in claim 15 characterized in that the support is transparent to visible and near infra-red radiation and that a semireflective layer is interposed between the substrate and the recording layer.

22. An optical recording element as claimed in claim 15 characterised in that a dielectric layer is interposed between the recording layer and substrate.

23. An optical recording element as claimed in claim 15 characterised in that the top surface of the recording medium is protected by an overcoat layer of material transparent to near infrared radiation either directly in contact with it or separated from it by a clean sealed, air, nitrogen or vacuum gap.

24. An optical data storage element in which information can be recorded and read directly afterwards by means of laser light comprising, as a recording medium a dye dissolved or dispersed in a binder characterised in that at least 25% by weight of the binder comprises a polymer in which at least 50% of the repeating units have the general formula:

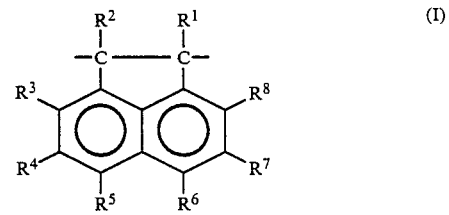

in which:

R¹ and R⁸ are independently selected from hydrogen, an alkyl group of up to 12 carbon atoms, an aromatic group of up to 12 carbon atoms, halogen, ether, carboxylic acid, detone, nitro, amino and hydroxy groups or any two adjacent groups of R¹ to R⁸ may comprise the necessary atoms to complete a carbocyclic or heterocyclic ring, and there are at least 10 units of formula (I) within the polymer chain.

* * * * *

UNITED STATES PATENT AND TRADEMARK OFFICE
CERTIFICATE OF CORRECTION

PATENT NO. : 4,861,697

DATED : August 29, 1989

INVENTOR(S) : Hulme-Lowe, Bell and Ferguson

It is certified that error appears in the above-identified patent and that said Letters Patent is hereby corrected as shown below:

Claim 24, column 12, line 62, "detone" should be --ketone--.

Signed and Sealed this

Fourteenth Day of May, 1991

Attest:

HARRY F. MANBECK, JR.

*Attesting Officer*    *Commissioner of Patents and Trademarks*